United States Patent

Hartmann

[15] 3,696,724
[45] Oct. 10, 1972

[54] DUAL BEAM RANGEFINDER
[72] Inventor: Rudolf Hartmann, Skokie, Ill.
[73] Assignee: Bell & Howell Company, Chicago, Ill.
[22] Filed: Dec. 30, 1969
[21] Appl. No.: 889,212

[52] U.S. Cl. ..............................95/44 C, 95/11 V
[51] Int. Cl. ..................................G03b 3/06
[58] Field of Search...................95/44 C, 44 R, 11 V

[56] References Cited

UNITED STATES PATENTS

| | | | |
|---|---|---|---|
| 2,241,185 | 5/1941 | Cohen | 95/42 |
| 2,464,166 | 3/1949 | Wood | 95/44 C |
| 3,529,528 | 9/1970 | Leitz | 95/44 C |

FOREIGN PATENTS OR APPLICATIONS 1,804,194  6/1969  Germany..................95/11 V

OTHER PUBLICATIONS

The British Journal of Photography, Sept. 12, 1924, p. 556.

Primary Examiner—Samuel S. Matthews
Assistant Examiner—E. M. Bero
Attorney—William F. Pinsak, John E. Peele, Jr., Kenneth W. Greb and William K. Serp

[57] ABSTRACT

A rangefinder system is mounted in a camera with a viewfinder system and an objective lens having an afocal lens portion and a prime lens portion between which a pair of light reflecting members, such as mirrors, are mounted offset from the optical axis of the objective lens, so as to not intersect the film image light rays, thereby minimizing light loss to the film and maximizing finder image brightness, and to reflect light rays from the entire scene to a plane in the viewfinder system causing a superimposed image to be viewable when the objective lens is in focus and to cause separate images to be viewable when the lens is not in focus. The mirrors are supported on structures, adjustable during assembly, for enabling correction of divergent or convergent light rays to collimated rays.

8 Claims, 4 Drawing Figures

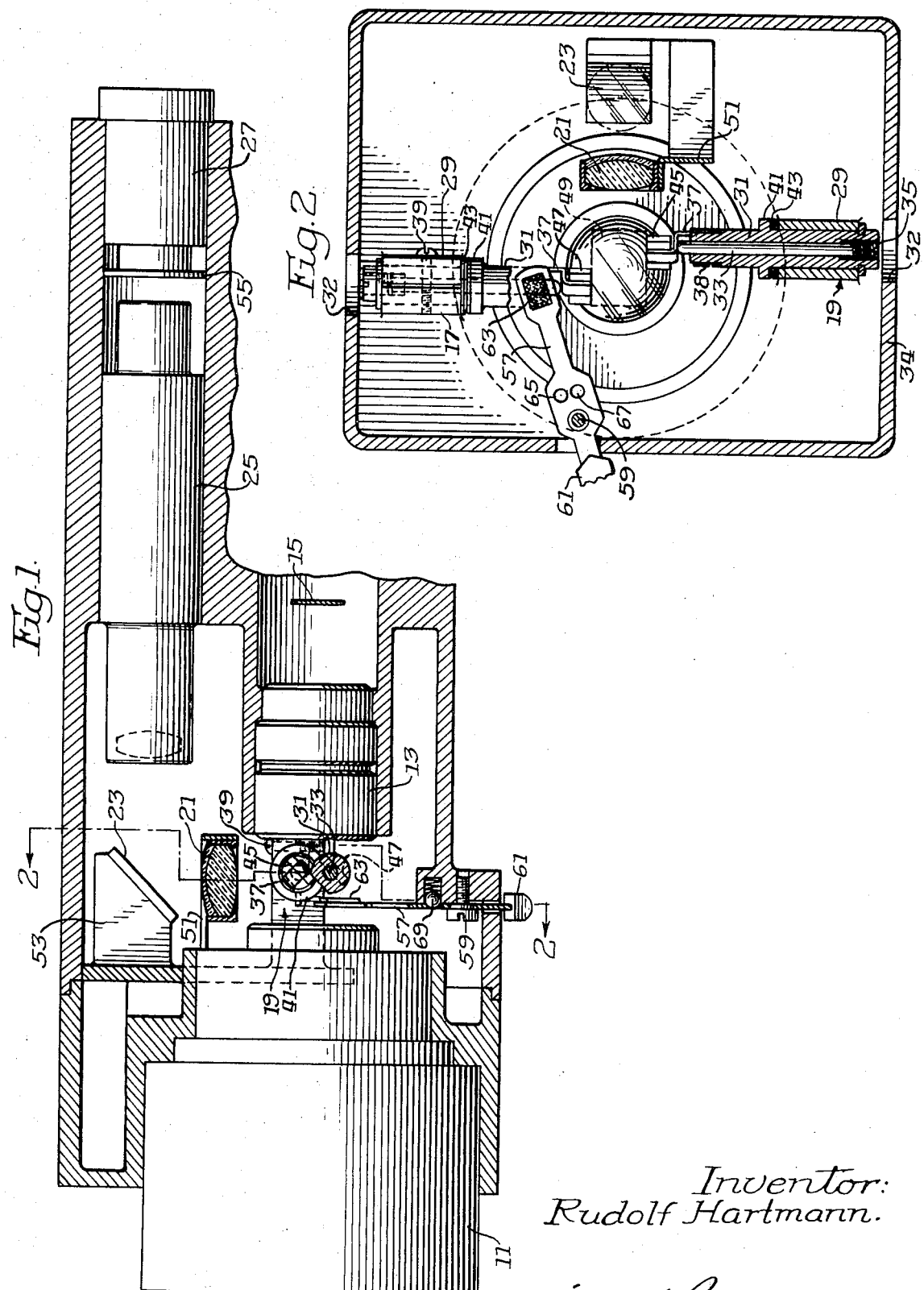

Inventor:
Rudolf Hartmann.

By William L. _____ Atty

DUAL BEAM RANGEFINDER

Various types of rangefinder or focusing systems have been proposed and are in use in single lens reflex cameras. These systems usually include a beamsplitter located along the optical axis of the camera. The beamsplitter reflects a part of the film image light rays to a rangefinder system. Except for beamsplitter losses, the remaining image light passes to the film plane when the shutter of the camera is opened. The rangefinder light rays are imaged on a reference screen such as a ground glass screen, a bi-prism, or a microgrid. When the rangefinder image is in focus on the screen, the film image is in focus at the film plane.

While systems of the general nature described in the preceding paragraph have found widespread use, they have not been entirely satisfactory. For example, they require beamsplitters which are inherently expensive to manufacture, thereby making the overall camera expensive to produce and sell. In addition, only a portion of the total incoming image light is received by the rangefinder and the film because of beamsplitter light losses. Further, because the image light must be split, neither the rangefinder nor the film receive the desired amount of light. Consequently, the film must be selected so that it is more sensitive than it would have to be if it received all of the light from the image. In addition, because of the low level of received light, the rangefinder cannot be used in dimly lit environments.

Therefore, it is an object of this invention to provide a new and improved rangefinder system.

It is also an object of this invention to provide a dual beam rangefinder suitable for use in a single lens reflex camera.

It is another object of this invention to provide a dual beam rangefinder system including a pair of mirrors located to intersect light rays peripheral to the film image to permit the maximum amount of light to reach the rangefinder and the film.

It is a further object of this invention to provide an adjustable support structure for adjusting each mirror to compensate for converging or diverging light coming from the zoom lens.

In accordance with a principle of this invention, a dual beam rangefinder system is provided. The rangefinder includes two reflecting means that are mounted between the zoom or afocal lens portion and the prime lens portion of an objective lens in a reflex camera so as to reflect light rays from the scene to be photographed into the viewfinder of the camera. The reflecting means are offset from the optical axis of the camera so that they do not intersect film image light rays. The reflected images are received by an optical system forming a part of the view-finder system. When the images from the reflecting means are superimposed on a predetermined plane in the viewfinder system as seen by the user of the camera, the lens system of the camera is in focus. When the images are not superimposed, the lens system is out of focus and must be changed.

In accordance with another principle of this invention, the reflecting means are two mirrors that are mounted so that they intersect peripheral light not essential to the film image, but containing all scene information. Hence, the mirrors do not reduce the amount of light passing to the film. In addition, the mirrors reflect sufficient light so that the camera can be utilized in relatively dimly lit environments.

It will be appreciated from the foregoing brief description of the invention that a dual beam rangefinder that overcomes many of the above-described disadvantages of the prior art is provided. Because the invention uses, preferably, mirrors, it is inexpensive to manufacture. Further, because the mirrors do not intersect the film image forming bundle of light rays, the light passed to the film is greater than with prior art systems that use beamsplitters. In addition, because the mirrors utilize peripheral light, which is unused for film image formation, a greater amount of light is applied to the eye of the user of the camera. Hence, a camera or optical instrument incorporating the invention can be utilized in lower light environments than can prior art rangefinder cameras utilizing beamsplitters. Because of these and other factors, the invention can be used with a low ratio zoom lens, i.e., 3-to-1, for example.

The present dual beam rangefinder system provides a cost advantage over the prior art by having each mirror adjustable to compensate for divergent or convergent light rays coming from the zoom lens. The cost advantage is derived from being able to produce a zoom lens unit with wider tolerance range for locating a series of lens elements than would normally be acceptable. A wider tolerance range provides a substantial manufacturing cost reduction.

Further and other objects will be apparent from the description of the accompanying drawings in which like numerals refer to like parts.

IN THE DRAWINGS

FIG. 1 is a schematic view of a preferred embodiment of the invention located between a zoom lens and a prime lens in a camera.

FIG. 2 is a cross-sectional view along line 2—2 of FIG. 1.

Figure 3:
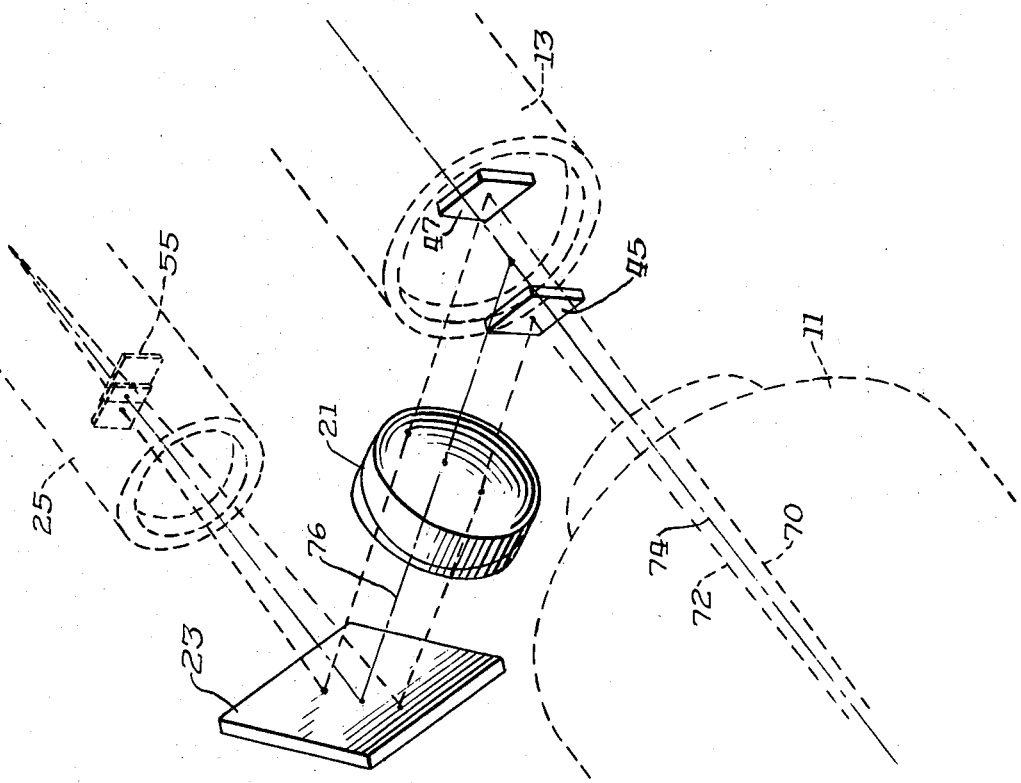
FIG. 3 is an optical diagram illustrating when the dual beam rangefinder of the invention is out of focus.

The embodiment of the invention illustrated in FIGS. 1 and 2 is mounted between a zoom or afocal lens portion 11 and a prime lens portion 13 of an objective lens 14. The zoom lens portion 11 of the objective lens may be any suitable zoom lens of an afocal lens system, which can be moved in any well known manner, such as by the operation of an electric motor or by the manual adjustment of the lens. The prime lens portion 13 may be any conventional camera lens that will image a scene viewed by the zoom lens at a film plane 15.

The embodiment of the invention illustrated in FIGS. 1 and 2 comprises: a left peek-in mirror support structure 17; a right peek-in mirror support structure 19; a viewfinder/rangefinder objective lens 21; a reflecting mirror structure 23; a rangefinder lens system 25; and an eye piece 27. The right and left peek-in mirror support structures are each adjustable and each comprise: a cylindrical clamp 29; a cylindrical bushing 31; a shaft 33; a cap screw 35; and, a mirror support element 37.

Each cylindrical clamp is longitudinally open along one edge that can be closed or opened by revolving a bolt 39 in a nut. Each cylindrical clamp 29 houses a cylindrical bushing 31 near one end of the bushing.

Each cylindrical bushing has an outwardly extending flange 41. A spring or bushing member 43 fits between each outwardly extending flange 41 and the inner edge of each cylindrical clamp 29. The shafts 33 pass through longitudinal cylindrical openings in the cylindrical bushing 31. The cap screws 35 are suitably threaded into the outer end of the longitudinal cylindrical openings so as to press against the outer ends of the shafts 33. The cap screws 35 are each aligned with an opening 32 in the camera housing 34.

The mirror support elements 37 each have a flat coil spring 38 formed at one end. The flat coil springs 38 fit over the outside of the cylindrical bushings 31 at the inner end thereof. The secondary flat coil springs 38 are fixedly attached at their inner termination points to the cylindrical bushings 31 by any suitable means, such as a rivet, for example. The mirror support elements 37 extend outwardly in a generally Z shaped manner from the other end of the flat coil spring 38. The cross members of the Z impinge on the inner end of the shafts 33. By this manner of mounting, when the cap screws 35 are rotated, the shafts 33 move in a longitudinal manner, thereby moving the mirror support elements 37 inwardly and outwardly as viewed in FIG. 2. A right peek-in mirror 45 is attached to the outwardly extending portion of the mirror support element 37 of the right peek-in mirror support structure 19. A left peek-in mirror 47 is attached to the outwardly extending portion of the mirror support element 37 of the left peek-in mirror support structure 17.

The right and left peek-in mirror support structures 17 and 19 are arranged so that the right and left peek-in mirrors are generally diagonally offset from the optical axis passing through the zoom lens and the prime lens. More specifically, the left peek-in mirror 47 is above the optical axis and to the left thereof as viewed in FIG. 2. The right peek-in mirror 45 is below the optical axis and to the right thereof as viewed in FIG. 2. By such an arrangement, the mirrors are located so that they do not intersect the film image forming bundle of light rays 49, illustrated by the rectangular dashed lines in FIG. 2. Hence, the light from the scene being viewed is passed directly from the zoom lens to the prime lens without loss while peripheral light is reflected by the right and left peek in mirrors, illustrated by light rays 70 and 72.

The right and left peek-in mirrors 45 and 47 are also mounted so that they are at an angle of 45° with respect to the plane of the zoom lens and the prime lens. The objective lens 21 is held in the camera by a suitable support 51 so that it intersects the images reflected by both the right and the left peek-in mirrors. Light ray 76 is a projected imaginary optical axis which extends through objective lens 21 and which intersects the optical axis light ray 74. The reflecting mirror 23 is held in the camera by a suitable support means 53 so that it also intersects both images after they pass through the objective lens. The reflecting mirror is held at an angle of approximately 45° with respect to the axis of the peek-in mirror images so as to reflect both images to the rangefinder lens system 25. The rangefinder lens system includes lenses (not shown) that focus both images at a front focal plane 55. The eyepiece 27 is mounted on the other side of the front plane from the rangefinder lens system so as to observe the images formed at the front focal plane 55.

Figure 4:
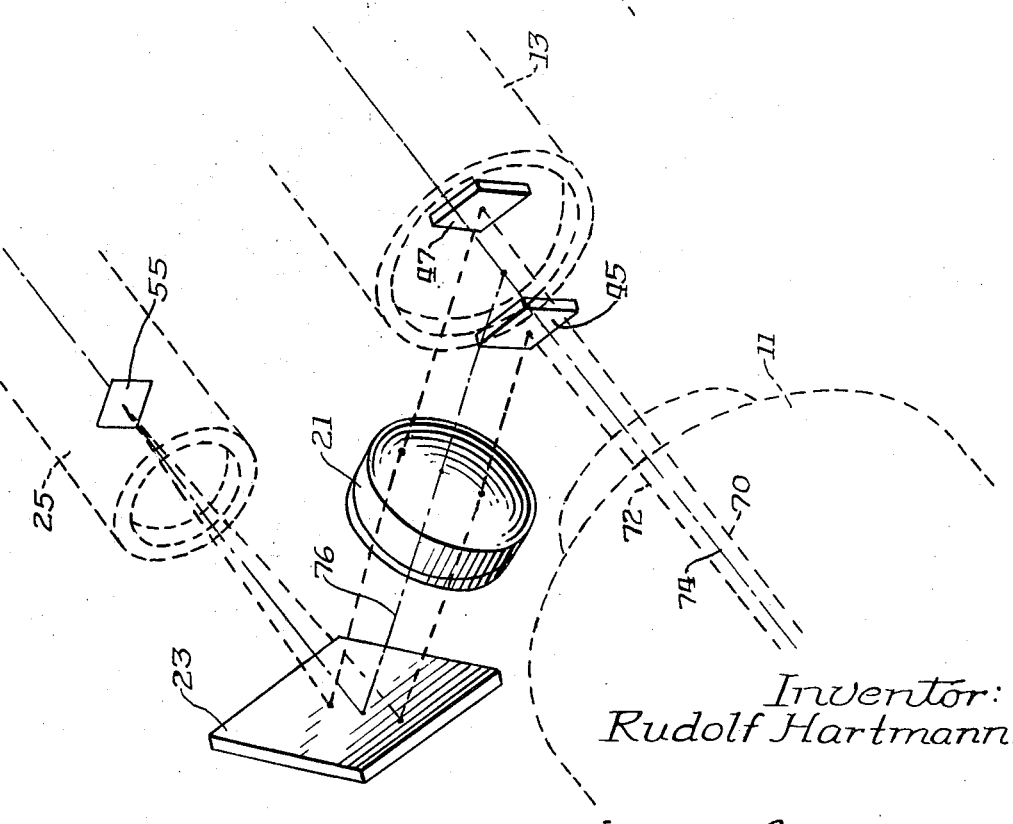
FIG. 4 is an optical diagram illustrating when the dual beam rangefinder of the invention is in focus.

The arrangement of the various mirrors and the objective lens is such that the afocal lens portion forms an image of a remote subject at the front focal plane 55 and with the prime lens portion also forms an image at the film plane 15. Each of the mirrors 45 and 47 forms an image at the focal plane. As viewed in FIG. 3, when the afocal lens portion is not focused on the subject, the images from mirrors 45 and 47 at the focal plane are displaced one from the other. Consequently, both images are individually seen by the user. However, when the zoom or afocal lens portion 11 is in focus, the two images are superimposed into a single image as illustrated in FIG. 4.

Also illustrated in FIGS. 1 and 2 is a lever arm 57 pivotally attached to the camera housing by a bolt 59. A handle 61 is attached to an outwardly extending end of the lever arm 57. An occluder 63 is mounted on the other end of the lever arm 57. By moving the lever arm 57 about the bolt 59, the occluder 63 is moveable into or out of the light passing region between the zoom lens 11 and the prime lens 13. The lever arm 57 includes two detent apertures 65 and 67 that cooperate with a ball-spring arrangement 69 held in the camera housing. In one position, the occluder 63 is out of the light passing region, thereby being ineffective. In the other position, the occluder 63 is in alignment with mirror 47 to block out one image from the rangefinder. It is sometimes desirable to block out one image when portions of the scene are out of the focal range and appear as a double image in the rangefinder after focusing on a particular object by the present superimposed method. The double image portion of the scene is irritable to the camera operator and can be eliminated by adjusting the occluder 63 to block out one image.

It will be appreciated by those skilled in the art and others that a focus condition with a zoom lens-prime lens of the type illustrated in FIGS. 1 and 2 is usually achieved when the zoom lens collimates the light from the scene to be photographed. For a system of this nature (i.e., parallel light rays) the left and right peek-in mirrors are generally mounted in a parallel arrangement. However, for some lens systems, the light from the zoom lens may be either divergent or convergent, such as the divergent light ray 70 or 72, as best shown in FIG. 3. Rays 70 and 72 are divergent relative to the optical axis 74. An adjusting means built within the zoom lens unit 11 to compensate for the convergent or divergent light rays would be undesirably expensive. The present invention will avoid this undesirable expense. The non-collimated light coming from the zoom lens 11 is compensated for with respect to the viewfinder by adjusting mirrors 45 and 47. The cylindrical bushings 31 are rotated inside of the cylindrical clamps 29 after the bolts 39 have been loosened to allow such movement. After the desired angular orientation is achieved, which is to reflect collimated light from the mirrors 45 and 47 to the objective lens 21, the bolts 39 are lightened to lock the cylindrical bushings 31 in place in the cylindrical clamps 39.

The non-collimated light coming from the zoom lens 11 is compensated for with respect to the film plane 15 by the prime lens 13 having an adjustable lens means built therein.

It will be appreciated by those skilled in the art and others that the foregoing description has described only a preferred embodiment of the invention, and that various modifications can be made in the embodiment. For example, other means for mounting the mirrors can be utilized. Moreover, if desired, prisms rather than mirrors can be utilized in the invention. Further, other types of rangefinder lens structures can be utilized. Hence, the invention can be practiced otherwise than as specifically described herein.

What is claimed is:

1. A rangefinder system to facilitate focusing an objective lens of a camera on a subject, the camera having a viewfinder system and said objective lens defining an optical path between first and second lens cells, said first lens cell transmitting light rays along said optical path for a frame of film in said camera and transmitting light rays along said optical path peripheral to said film frame, the system comprising:

a first reflecting means mounted in said optical path between the lens cells of said objective lens for intersecting only said light rays peripheral to the film frame and reflecting only said peripheral light rays in a predetermined direction;

a second reflecting means mounted in said optical path between said same lens cells of said objective lens for intersecting only other light rays peripheral to the film frame and reflecting only said other peripheral light rays in a predetermined direction; and an optical system arranged in said camera to receive said peripheral light rays reflected by said first and second reflecting means to form a superimposed image in a predetermined plane in said viewfinder system when the objective lens of said camera is in focus on the subject and to form separate images in said plane when the objective lens is not focused on the subject.

2. A rangefinder system as claimed in claim 1 wherein the path of the light rays reflected by said first reflecting means is different than the path of the light rays reflected by said second reflecting means.

3. A rangefinder system as claimed in claim 2 wherein said optical system includes a secondary objective lens and a reflector located between said first and second reflecting means and said viewfinder system, said secondary objective lens being mounted to image the light rays reflected by said first and second reflecting means toward said reflector, and said reflector being mounted to reflect said light rays to said predetermined plane in said viewfinder system.

4. A rangefinder system as claimed in claim 3 wherein said first and second reflecting means are mirrors.

5. A rangefinder system as claimed in claim 4 wherein said first and second mirrors are held in first and second mirror support structures.

6. A rangefinder system as claimed in claim 5 wherein said first and second mirror support structures are each adjustable to compensate for divergent or convergent light rays transmitted to each of said mirrors.

7. A rangefinder system as claimed in claim 5 wherein each of said first and second mirror support structures comprises:

a cylindrical clamp mounted in said camera;
a cylindrical bushing held at one end in said cylindrical clamp;
a shaft passing through a longitudinal opening in said cylindrical bushing;
a cap screw threaded into one end of said cylindrical bushing so as to impinge on one end of said shaft; and
a mirror support member springably attached to the other end of said cylindrical bushing and impinging on the other end of said shaft, said mirror support member supporting one of said mirrors at a predetermined angle with respect to the optical axis of said camera.

8. A rangefinder system as claimed in claim 1 comprising:

an occluder mounted in the camera and selectively operable from an ineffective position to an effective position to block out light rays from one of said reflecting means for converting said rangefinder system to a viewfinder system.

* * * * *